(12) United States Patent
Tsubaki

(10) Patent No.: US 12,423,793 B2
(45) Date of Patent: Sep. 23, 2025

(54) INSPECTION DEVICE, INSPECTION METHOD AND PROGRAM

(71) Applicant: TOYOTA JIDOSHA KABUSHIKI KAISHA, Toyota (JP)

(72) Inventor: Yuta Tsubaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 512 days.

(21) Appl. No.: 17/870,429

(22) Filed: Jul. 21, 2022

(65) Prior Publication Data

US 2023/0070333 A1    Mar. 9, 2023

(30) Foreign Application Priority Data

Sep. 8, 2021  (JP) .................................. 2021146081

(51) Int. Cl.
G06T 7/00    (2017.01)
(52) U.S. Cl.
CPC .. G06T 7/0004 (2013.01); *G06T 2207/20021* (2013.01); *G06T 2207/20032* (2013.01); *G06T 2207/20081* (2013.01); *G06T 2207/20084* (2013.01); *G06T 2207/20221* (2013.01); *G06T 2207/30156* (2013.01)
(58) Field of Classification Search
None
See application file for complete search history.

(56) References Cited

U.S. PATENT DOCUMENTS 5,491,563 A * 2/1996 Pomerantz ............. H04N 1/448
                                                            380/243
10,860,836 B1 * 12/2020 Tyagi ..................... G06N 3/084

2019/0294961 A1    9/2019  Zuev et al.
2019/0331483 A1   10/2019  Sano et al.
2020/0357106 A1 * 11/2020  Lin ...................... G06V 10/764
2022/0335586 A1 * 10/2022  Yahashi ................. G06T 11/00

FOREIGN PATENT DOCUMENTS

| CN | 111967335 A | * 11/2020 |
| CN | 112651920 A |   4/2021  |
| JP | 10-176997 A |   6/1998  |
| JP | 2019-192131 A | 10/2019 |
| WO | 2021/064893 A1 |   4/2021 |

OTHER PUBLICATIONS

Zhu et al., "A Unified Framework of Intelligent Vehicle Damage Assessment based on Computer Vision Technology", 2019 IEEE 2nd International Conference on Automation, Electronics and Electrical Engineering (AUTEEE), 2019, pp. 124-128 (5 pages).

* cited by examiner

*Primary Examiner* — Sj Park
*Assistant Examiner* — Caroline E. Depalma
(74) *Attorney, Agent, or Firm* — Sughrue Mion, PLLC

(57) ABSTRACT

An inspection device includes: a captured image acquisition unit configured to acquire a captured image obtained by capturing an image of an inspection target; an image division unit configured to divide the captured image which is acquired into a plurality of first division images; a first composite image generation unit configured to superimpose the plurality of first division images to generate a composite image; and a determination unit configured to use the generated composite image and a learning model to determine whether or not a defect is present in the inspection target.

14 Claims, 16 Drawing Sheets

INSPECTION DEVICE, INSPECTION METHOD AND PROGRAM

CROSS REFERENCE TO RELATED APPLICATIONS

This application is based upon and claims the benefit of priority from the prior Japanese Patent Application No. 2021-146081, filed on Sep. 8, 2021, the content of which is incorporated herein by reference in its entirety.

BACKGROUND

Field

The present disclosure relates to inspection devices, inspection methods and programs.

Related Art

An analyzer is known which captures an image of the surface of a vehicle and inputs acquired image data to a learning model to determine a cause a coating failure occurrence on the surface of the vehicle (see, for example, Japanese Patent Application Publication No. 2019-192131). When a large area region, such as a side surface of a vehicle, is inspected, it is preferable to acquire a larger image in order to reduce the inspection time. However, when the image is large, the size of a defect to be detected may be small in relation to the size of the image, with the result that it may be difficult to detect the defect by image determination using machine learning. Hence, it may be considered to divide the image into smaller images to be used to perform an inspection. However, when the image is simply divided, and thus the sizes of images are reduced, the number of images to be inspected is increased, with the result that the inspection time is disadvantageously increased.

SUMMARY

According to an aspect of the present disclosure, an inspection device is provided. The inspection device includes: a captured image acquisition unit configured to acquire a captured image of an inspection target; an image division unit configured to divide the captured image into a plurality of first division images; a first composite image generation unit configured to generate a composite image by superimposing the plurality of first division images; and a determination unit configured to determine whether a defect is present in the inspection target by using the generated composite image and a learning model.

According to the inspection device of this aspect, the size of one image used for the inspection is decreased as compared with the captured image, and thus it is easy to detect a defect. Also, the number of images inspected is reduced, with the result that it is possible to reduce the inspection time.

DETAILED DESCRIPTION

A. First Embodiment

Figure 1:
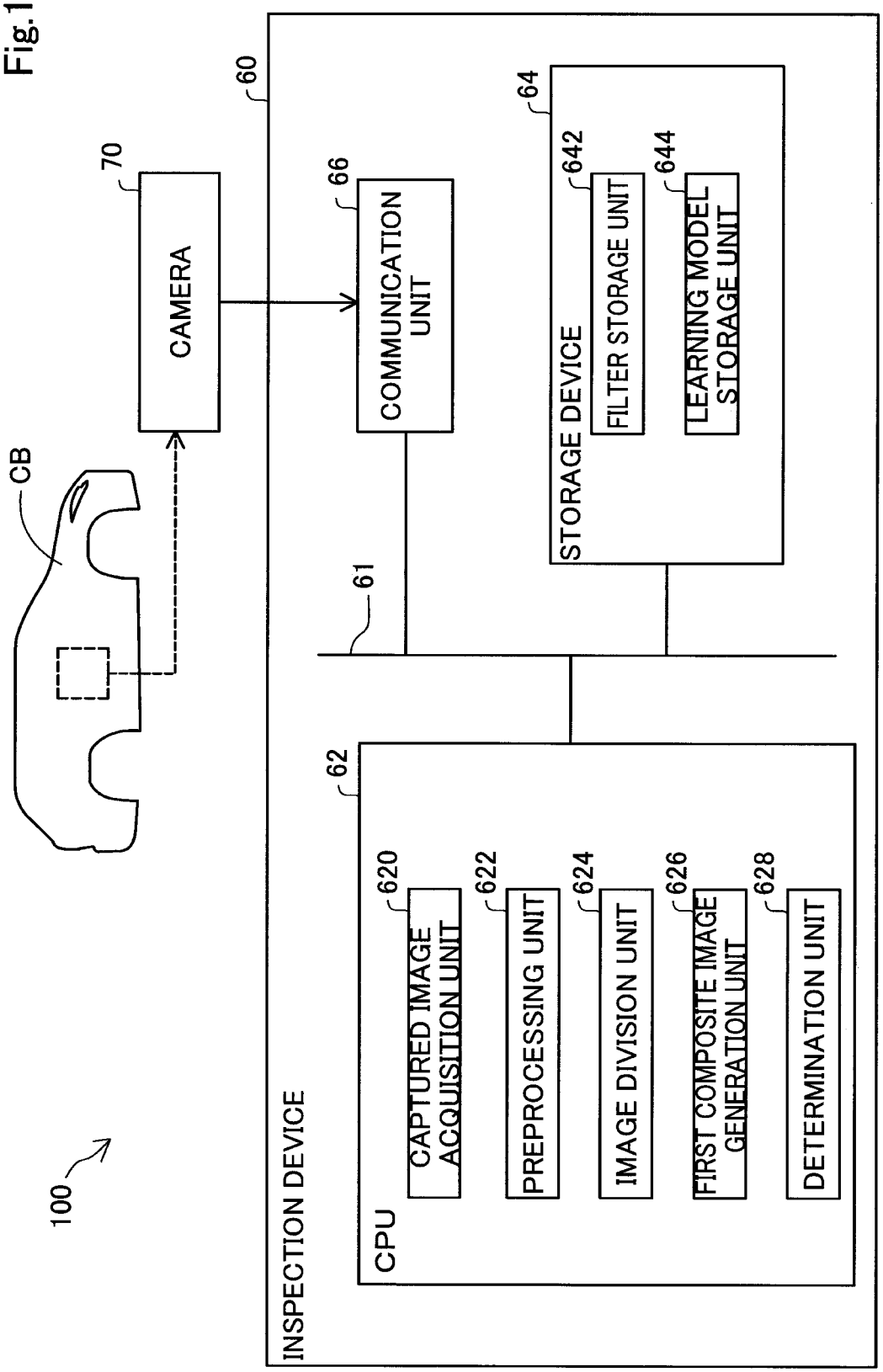
FIG. 1 is an illustrative view schematically showing an overall configuration of an inspection system.

FIG. 1 is an illustrative view schematically showing an overall configuration of an inspection system 100. The inspection system 100 includes an inspection device 60 according to a first embodiment of the present disclosure and a camera 70. The inspection device 60 uses a captured image which is processed in a manufacturing process and serves as an inspection target, and thereby performs the detection of a defect by utilization of machine learning. In the present embodiment, the inspection target is, for example, the car body CB of an automobile coated with a sealer, and the defect is, for example, the sealer which is adhered to the top of the surface of the car body CB and serves as a foreign substance. The sealer is a paste material which is applied, for example, in order to reduce gaps in the joints of the car body and enhance the airtightness of the car body. As the sealer, various materials such as vinyl chloride, epoxy resin and synthetic rubber are used according to the purpose of use. The inspection target is not limited to an automobile, and may be various moving bodies such as a railroad vehicle, an aircraft and a ship and may be various products such as constituent parts thereof.

The camera 70 captures an image of the inspection target. The camera 70 is connected to the inspection device 60 via a network. In the present embodiment, the captured image acquired by the camera 70 is configured with RGB input image signals which are composed of image signal components respectively represented by R (red), G (green) and B (blue). In the present embodiment, 8 bits are allocated to each image signal, and a total amount of information of 24 bits is allocated. The size of the captured image acquired by the camera 70 may be arbitrarily set according to the resolution of the camera, the accuracy of detection of a defect required for the inspection device 60, the size of the defect to be detected, an image size capable of being processed by a learning model and the like. In the present embodiment, the camera 70 acquires the captured image having 12 million pixels with 4000 pixels in width×3000 pixels in height. However, the captured image is not limited to the form described above, and the input image signals of the captured image may be, for example, YUV image signals composed of Y (luminance signal), U (first color difference signal) and V (second color difference signal) or may be YCbCr image signals or YPbPr image signals. Any total amount of information such as 16 bits, 30 bits, 32 bits, 48 bits or 64 bits may be allocated to the individual image signals. The captured image may be a color image, a monochrome image or a grayscale image with luminance values of any color depth such as 1 bit or 8 bits. The camera 70 does not need to be separate from the inspection device 60, and may be integral with the inspection device 60.

The inspection device 60 includes a central processing unit (CPU) 62, a storage device 64 and a communication unit 66. The CPU 62, the storage device 64 and the communication unit 66 are connected to each other via a bus 61 and can communicate in both directions. The CPU 62 executes various types of programs stored in the storage device 64 to function as a captured image acquisition unit 620, a preprocessing unit 622, an image division unit 624, a first composite image generation unit 626 and a determination unit 628. The inspection device 60 may include a display unit which has the function of displaying data obtained by various types of processing described in detail below and data generated in the process of the processing.

The storage device 64 is, for example, a RAM, a ROM and a hard disk drive (HDD). The HDD or the ROM stores various types of programs for realizing functions provided in the present embodiment, and the various types of programs read from the HDD or the ROM are expanded on the RAM and executed by the CPU 62. The storage device 64 includes: a filter storage unit 642 which stores various filters used for preprocessing on the captured image; and a learning model storage unit 644 which stores a machine learning model. The storage device 64 temporarily stores various types of images generated by the preprocessing unit 622, the image division unit 624 and the first composite image generation unit 626 and a defect probability calculated by the determination unit 628. As the storage device 64, an optical disc, an SSD (Solid State Drive), a flash memory or the like may be used.

The communication unit 66 is an interface which performs, with the camera 70 via the network, communication control for receiving the captured image used for an inspection. The captured image acquisition unit 620 acquires the captured image from the camera 70 via the communication unit 66.

The preprocessing unit 622 performs the preprocessing on the captured image. Specifically, the preprocessing unit 622 uses an image processing filter stored in the filter storage unit 642 to process the captured image according to a predetermined procedure. By the preprocessing, areas other than the defective area, such as a foreign substance included in the captured image, are prevented from being prominent, and the RGB values of the background other than the defective area or gradation values, such as luminance values obtained by performing luminance conversion on the RGB values are reduced, with the result that it is possible to enhance the accuracy of detection of the defective area in the captured image. Examples of the image processing filter stored in the filter storage unit 642 include various methods such as an expansion filter, a contraction filter, an averaging filter, a median filter, an edge extraction filter, an edge enhancement filter, a Sobel filter and a Laplacian filter. In the present embodiment, the filter storage unit 642 stores the image processing filters to which histogram equalization, the median filter, a Gaussian filter and binarization and morphological transformations are applied.

The image division unit 624 divides one captured image into a plurality of images. An image generated by dividing, with the image division unit 624, the captured image acquired by the captured image acquisition unit 620 is also referred to as a "first division image". A division number and a size achieved by the image division unit 624 may be arbitrarily set in the width direction and the height direction of the image. In the present embodiment, the image division unit 624 divides the captured image into images of the same size to generate 80 first division images.

The first composite image generation unit 626 superimposes a plurality of images to generate a composite image. In the present embodiment, the first composite image generation unit 626 uses so-called digital composite to totalize the gradation values of a plurality of first division images and thereby generate one composite image. The composite image may be generated by totalizing R values, G values and B values or may be generated by totalizing luminance values. When each of a plurality of first division images has a different size, the first composite image generation unit 626 may combine the first division images according to the first division image which has the maximum size among them or may resize the first division images to an arbitrary size to combine the first division images. The first composite image generation unit 626 may perform weighted averaging on a plurality of first division images to superimpose them.

The determination unit 628 utilizes machine learning to determine whether or not a defect is present in the inspection target. Specifically, the determination unit 628 inputs the composite image to the learning model stored in the learning model storage unit 644 to perform the inspection on the inspection target. In the present embodiment, the learning model storage unit 644 stores, as the learning model for the machine learning, models which use R-CNN (Region Based Convolutional Neural Networks). The "models using the R-CNN" include various versions of the R-CNN such as Mask R-CNN, Faster R-CNN, Fast R-CNN, YOLO and Mesh R-CNN. The learning model is not limited to the models using the R-CNN, and various models may be used which include neutral networks such as a model using a Convolutional Neural Network (CNN) like an SSD (Single Shot MultiBox Detector), a Generative Adversarial Network (GAN), a Variational Autoencoder (VAE) and an autoregressive generation net.

The determination unit 628 inputs image data to the learning model to calculate a defect probability for each predetermined region within the input image data. The defect probability means the probability that the inspection target has a defect. In general, the size of the image data which is input to the learning model is defined by performance such as the calculation speed of the CPU 62 and the storage device 64 in the inspection device 60. In the present embodiment, the determination unit 628 resizes the image data to a size of about 400 pixels in height×400 pixels in width, and then calculates the defect probability. Hence, for example, when the image data which has a size larger than the size of about 400 pixels in height×400 pixels in width is input to the learning model, the defect may be compressed by the resizing. Consequently, for example, the defective area may be recognized as noise so as not to be detected as a defect.

The determination unit 628 uses the calculated defect probability to determine whether or not a defect is present in the inspection target. Specifically, the determination unit 628 compares the calculated defect probability with a threshold value previously stored in the storage device 64, and thereby determines whether or not a defect is present in the inspection target. The threshold value may be previously set by using any value. For example, the threshold value may be experimentally determined by using a correlation between whether or not a defect is present in the inspection target and the calculated defect probability. In the present embodiment, the threshold value is set to be 2.0%.

In the present embodiment, the determination unit 628 further transmits, according to the result of the inspection, a command signal for switching the transport route of a product in a manufacturing line and a command signal for providing notification using an alarm to the manufacturing line via the communication unit 66. The determination unit 628 may transmit the defect probability which will be described later, a region where the defect probability is high and the like to another inspection device, a terminal device for a manager, a local computer and the like.

Figure 2:
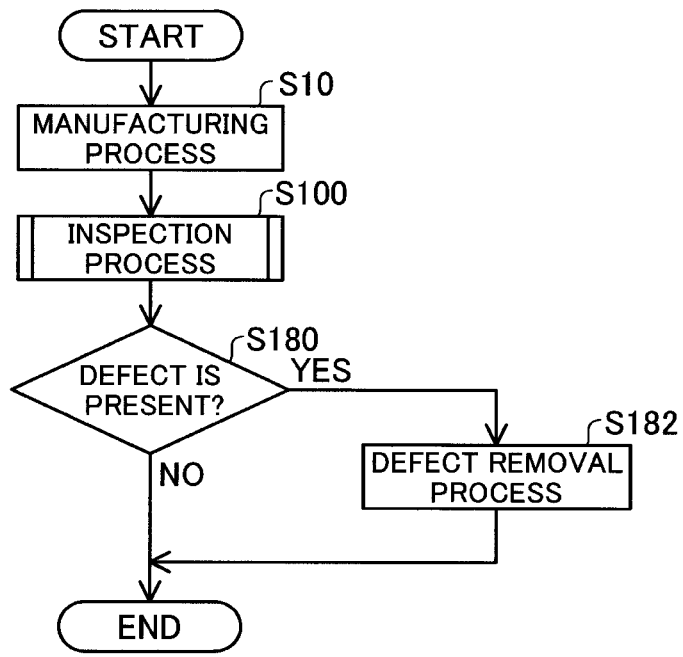
FIG. 2 is a process chart showing a manufacturing process including an inspection process performed by an inspection device.

FIG. 2 is a process chart showing the manufacturing process including an inspection process performed by the inspection device 60. In step S10, predetermined processing in the manufacturing process is performed on the product. The processing in the manufacturing process includes various acts, such as the machining of the product, surface treatment, casting, molding, welding, coating and transporting, for performing specific operations on the inspection target. In the present embodiment, the manufacturing process is a coating process for applying the sealer to the car body after electrodeposition coating. In the present embodiment, the color of the car body after the electrodeposition coating is grey, and the color of the sealer is white. When the sealer is adhered as a foreign substance to a position which is not in a predetermined coating range, the sealer which has a relatively small size equal to or less than φ1 to 2 mm may be adhered thereto.

In step S100, the inspection process is performed by the inspection device 60. In the present embodiment, the inspection device 60 inspects the top of the surface of the car body CB after the application of the sealer to inspect whether or not the sealer serving as the foreign substance is present. In step S180, whether or not to switch the dispatching destination of the product is determined according to the inspection result in the inspection process. In the present embodiment, if the inspection device 60 determines, in the inspection process, that the product has a defect (S180: YES), the inspection device 60 transmits, to the manufacturing line, the command signal for providing notification using the alarm and the command signal for switching the transport route of the product in the manufacturing line. As a result, the product that has been determined to have a defect is dispatched to a defect removal process in step S182. In the defect removal process, processing for removing the defect from the product is performed. In the present embodiment, the sealer adhered to the top of the surface of the car body CB is removed. Consequently, the defect is removed, and the product is dispatched to a subsequent process. The subsequent process is a process for performing so-called main coating which includes middle coating, base coating and clear coating. If the inspection device 60 determines that the product has no defect in the inspection step (S180: NO), the inspection device 60 does not output any command signal to the inspection device 60, with the result that the product is dispatched to the subsequent process and the present process is completed.

Figure 3:
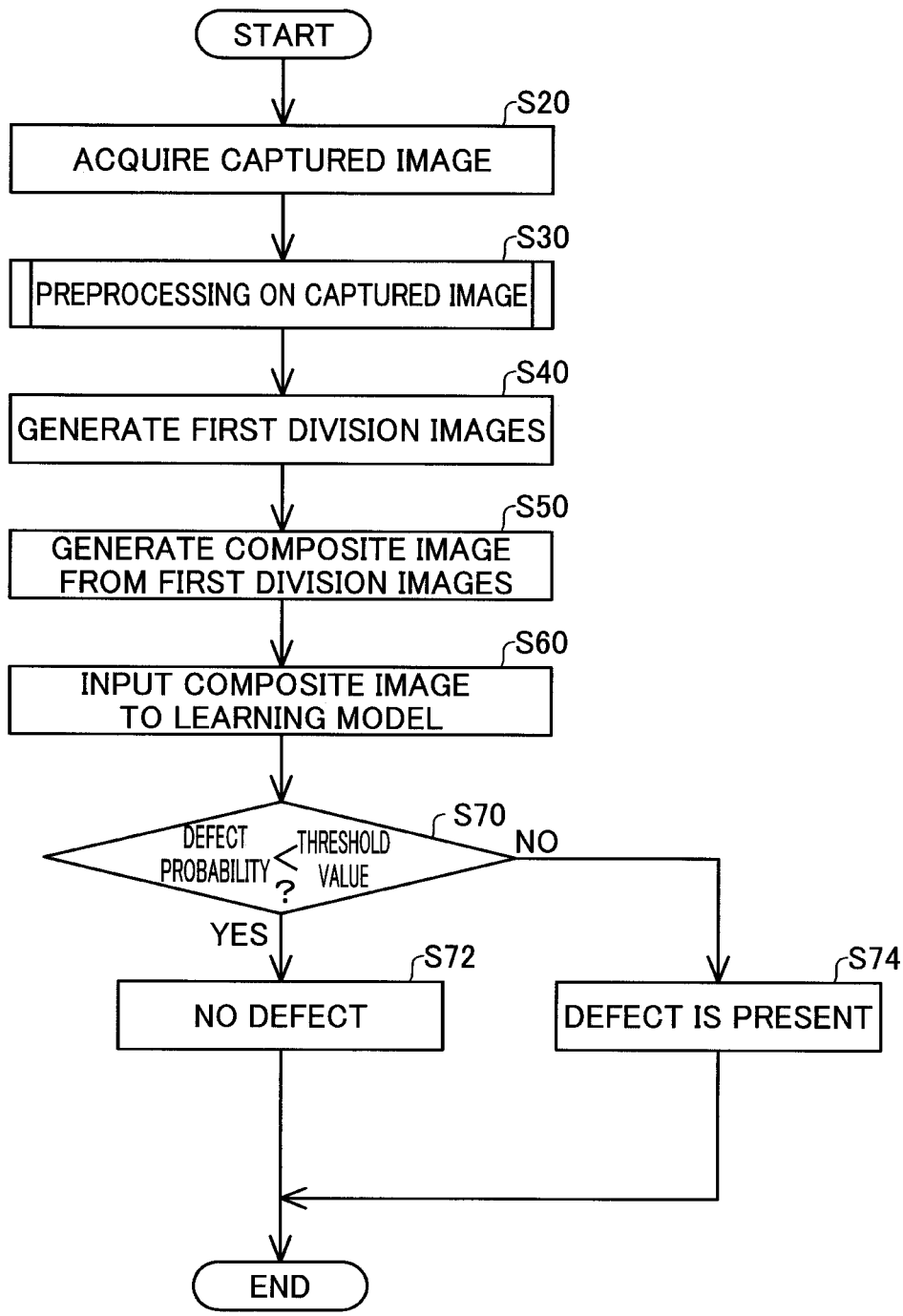
FIG. 3 is a process chart showing the details of the inspection process performed by the inspection device.

FIG. 3 is a process chart showing the details of the inspection process performed by the inspection device 60. For example, the process shown in FIG. 3 is started by detecting, with the inspection device 60, the product dispatched from the manufacturing process. The present process may be started when the inspection device 60 receives, from the manufacturing process, a signal indicating that the processing is completed. When the present process is started, the learning model has already completed learning with the image of a normal inspection target and the image of an inspection target having a defect. Although the process shown in FIG. 3 shows an example where the captured image acquisition unit 620 acquires a single captured image, when the captured image acquisition unit 620 acquires a plurality of captured images, the present process may be repeatedly performed on each of the captured images.

In step S20, the captured image acquisition unit 620 acquires the captured image of the inspection target captured by the camera 70. The number of areas of the inspection target whose images are captured is not limited to one, and the images of a plurality of areas may be captured and a single camera 70 or a plurality of cameras 70 may be set according to the number of areas whose images are captured. The captured image which is acquired is output to the preprocessing unit 622.

Figure 4:
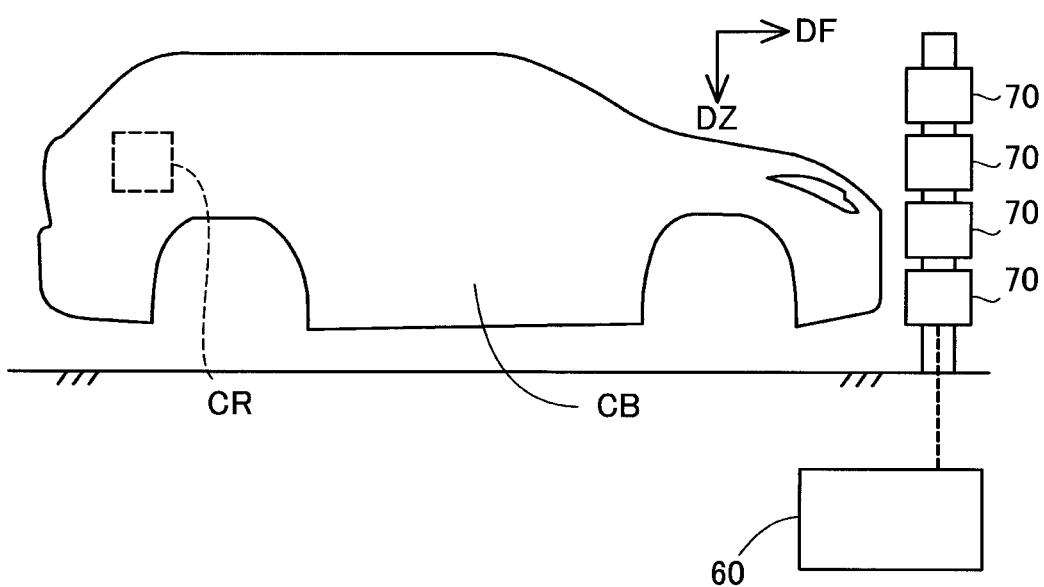
FIG. 4 is an illustrative view showing how cameras capture images of an inspection target.

FIG. 4 is an illustrative view showing how the cameras 70 capture images of the inspection target. FIG. 4 schematically shows a side surface of the car body CB as the inspection target. The inspection range of the side surface of the car body CB is likely to be broader than the inspection ranges of other areas of the car body CB such as the back surface of the car body CB.

In the manufacturing line, the cameras 70 are installed to be fixed on the transport route for transporting the car body CB along a transport direction DF. In the present embodiment, an unillustrated lighting device for emitting light toward the car body CB from behind the back surface of the cameras 70 is provided on the side of the back surface of the cameras 70. In this way, by utilization of a difference in reflectance between the grey car body CB and the white sealer, it is possible to acquire the captured images in which a difference in contrast between the car body CB and the sealer is more pronounced.

FIG. 4 schematically shows the image capturing range CR of one captured image. In the present embodiment, the camera 70 captures a range of about 400 mm×400 mm for one area of the car body CB. The camera 70 repeatedly captures, under the light emitted from the lighting predetermined time intervals corresponding to the transport speed of the car body CB. In this way, it is possible to capture images of the side surface of the car body CB at predetermined intervals in the transport direction DF. A plurality of cameras 70 are arranged along a vertical direction DZ. In this way, the cameras 70 are able to simultaneously capture images of a plurality of inspection areas along the vertical direction DZ.

Figure 5:
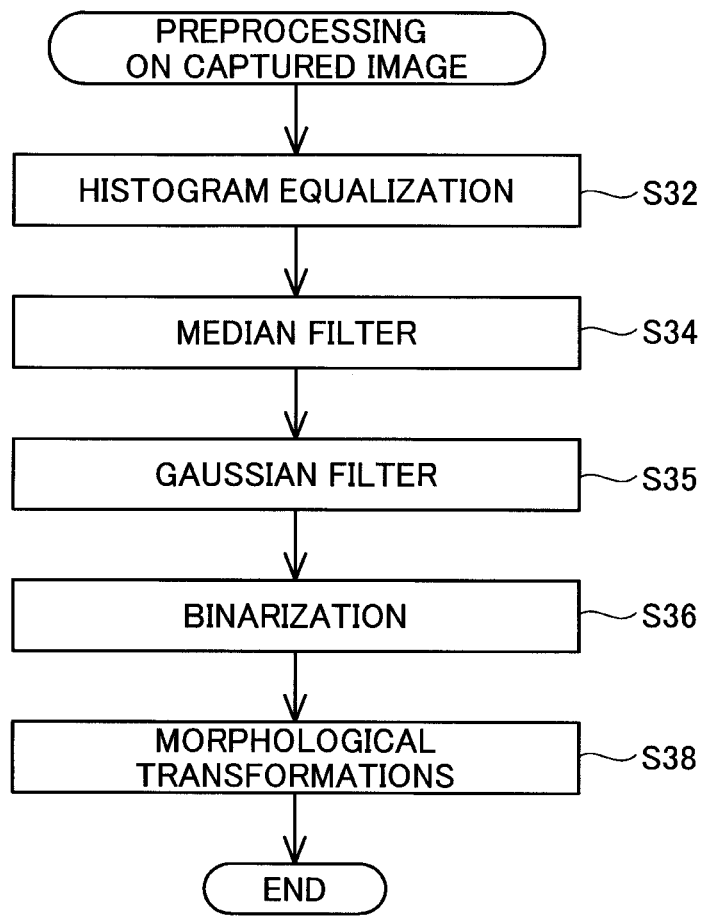
FIG. 5 is a process chart showing the processing routine of preprocessing on an image captured by a preprocessing unit.

As shown in FIG. 3, in step S30, the preprocessing unit 622 performs the preprocessing on the captured image which is acquired. FIG. 5 is a process chart showing the processing routine of the preprocessing on the image captured by the preprocessing unit 622. In step S32, the preprocessing unit 622 performs image processing corresponding to the histogram equalization on the captured image which is acquired. The histogram equalization is performed, and thus the distribution of the gradation values of the entire captured image which is acquired is equalized, with the result that the contrast of the captured image may be enhanced. When the accuracy of detection of a defect is sufficiently acquired, the histogram equalization may be omitted.

In step S34, the preprocessing unit 622 performs image processing using the median filter on the captured image. By using the median filter, a noise component in the captured image is removed. In step S35, the preprocessing unit 622 performs image processing using the Gaussian filter on the captured image. Any smoothing filter other than the Gaussian filter may be used. By the median filter and the Gaussian filter, regions of areas other than the defective area, such as the background, are prevented from being prominent. In step S36, the preprocessing unit 622 performs image processing using the binarization. A threshold value for the binarization may be set by using any method such as a mode method, a P tile method or a discriminant analysis method. In the present embodiment, the threshold value for the binarization is set equal to or greater than 200.

In step S38, the preprocessing unit 622 performs image processing using morphology transformation processing on a generated binary image. Specifically, the preprocessing unit 622 performs the processing of contraction (Erosion) and expansion (Dilation) on the obtained binary image. In the contraction, convolution using a convolutional layer is performed on the binary image. As a result, the part of the binary image which corresponds to white is contracted. In the expansion, convolution using a convolutional layer is performed on the binary image. As a result, the part of the binary image which corresponds to black is contracted. As the morphology transformation processing, processing such as opening processing (Opening), closing processing (Closing), morphology gradient processing (gradient), top hat transformation processing or black hat transformation processing may be applied. In the Opening, an object in the image is contracted and is then expanded. In the Closing, an object in the image is expanded and is then contracted. The morphology gradient is processing for determining a difference between the expanded image and the contracted image. Consequently, the outline of an object, that is, a part which may be a defect becomes clear. When the binary image is used to sufficiently obtain the accuracy of detection of a defect, the morphology transformation may be omitted.

Figure 6:
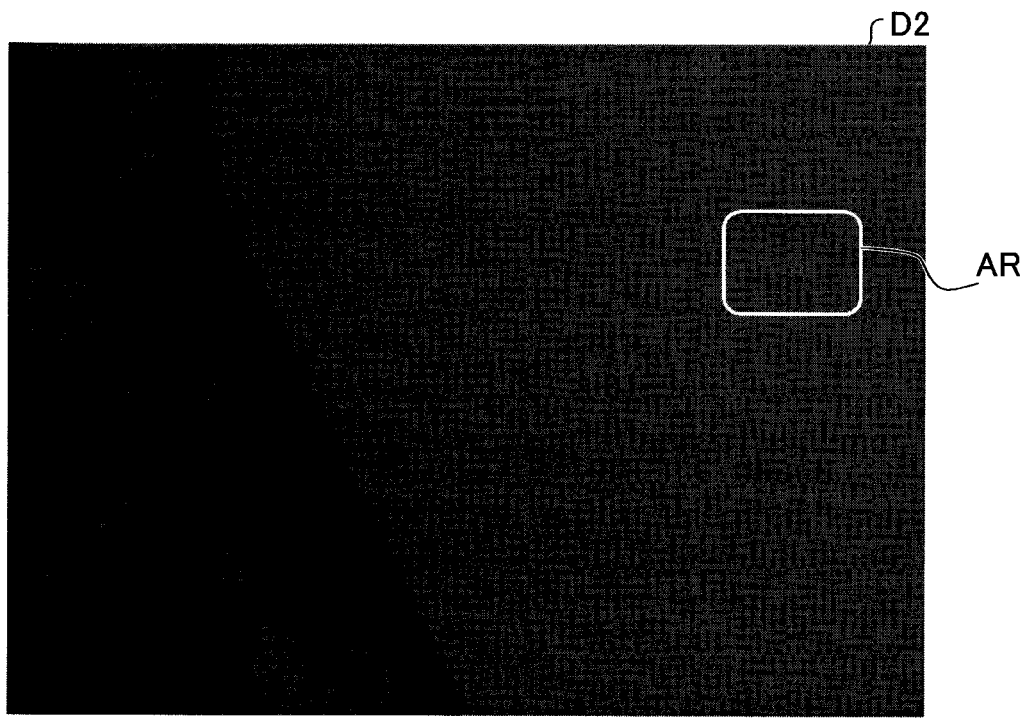
FIG. 6 is an illustrative view showing an example of the captured image.

FIG. 6 is an illustrative view showing an example of the captured image. The captured image D2 shown in FIG. 6 is a result obtained by capturing an image of the image capturing range CR on the side surface of the car body CB shown in FIG. 5. In the range AR of the captured image D2, an image of the sealer which serves as a defect and is adhered to the car body CB is captured. In the captured image D2, the image of the sealer serving as the defect is captured as white, and has a gradation value higher than the gradation value of the surface of the car body CB whose image is captured as grey.

Figure 7:
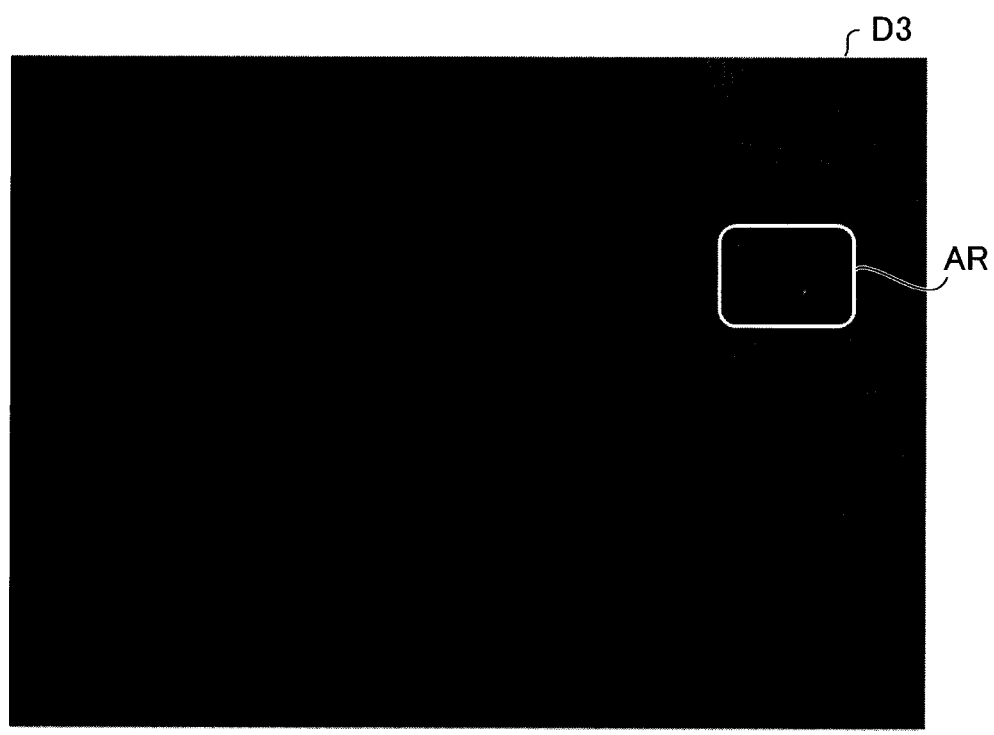
FIG. 7 is an illustrative view showing an example of the captured image after the preprocessing.

FIG. 7 is an illustrative view showing an example of the captured image after the preprocessing. The captured image after the preprocessing is also referred to as a "preprocessed image". The preprocessed image D3 shown in FIG. 7 is an image obtained by performing, on the captured image D2 shown in FIG. 6, with the preprocessing unit 622, the image processing of the histogram equalization, the median filter, the Gaussian filter, the binarization and the morphological transformations. As shown in FIG. 7, the median filter, the Gaussian filter and the binarization are performed in this order, and thus noise in the image and the gradation value of the background other than the defective area are set to substantially zero, with the result that it is possible to prevent areas other than the defective area from being prominent. When, for example, the order of the median filter, the Gaussian filter and the binarization is changed, the accuracy of detection may be lowered by the remaining noise in the image and the disappearance or reduction of the defect to be detected.

Figure 8:
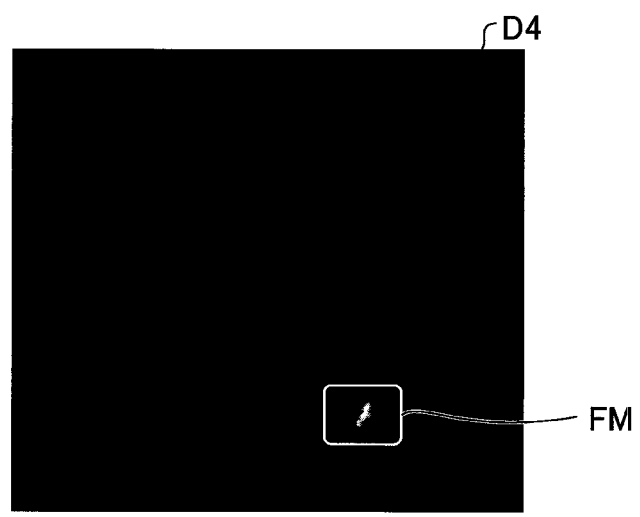
FIG. 8 is an illustrative view showing an enlarged defective area in the image after the preprocessing.

FIG. 8 is an illustrative view showing an enlarged defective area in the image after the preprocessing. The image D4 shown in FIG. 8 is an image which corresponds to the area of the range AR in FIG. 7. As shown in FIG. 8, in the image D4 after the preprocessing, a defect FM serving as an example of the defect, and specifically the sealer adhered to the side surface of the car body CB is left as a white image.

Figure 9:
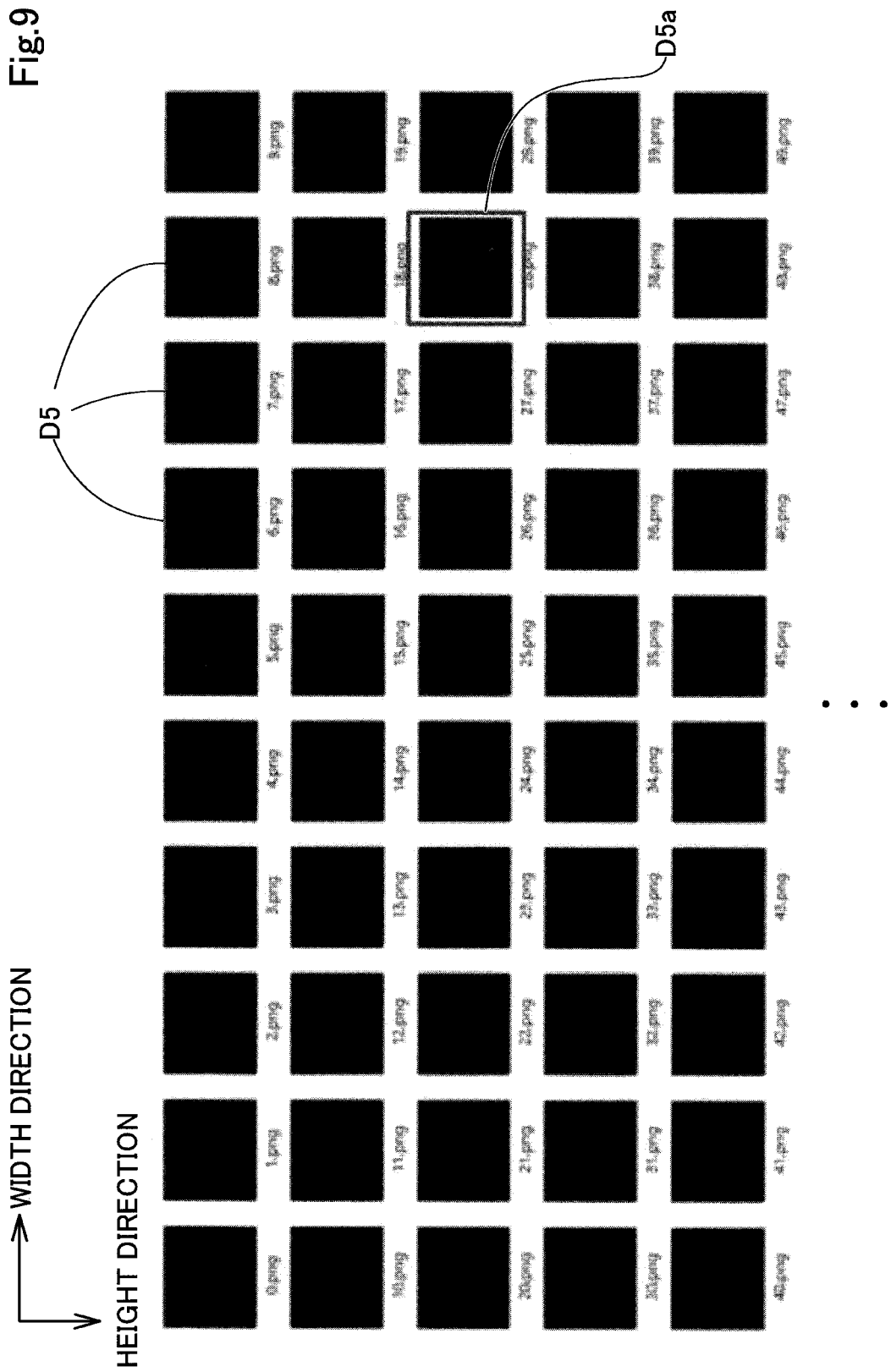
FIG. 9 is an illustrative view showing an example of first division images generated by an image division unit.

In step S40, the image division unit 624 divides the captured image after the preprocessing into a plurality of first division images. FIG. 9 is an illustrative view showing an example of the first division images generated by the image division unit 624. The first division images D5 shown in FIG. 9 are images obtained by dividing the preprocessed image D3 shown in FIG. 7. In the present embodiment, the sizes of the first division images D5 are equal to each other, and as described later, the first division images D5 are equal in size to the composite image. The size of the first division image, that is, the division number is preferably set based on the size of image data capable of being input to the learning model and the size of a defect to be detected. It is found from the result of an experiment that when the width of the image is equal to or less than 50 times the width of the defect to be detected and the height of the image is equal to or less than 50 times the height of the defect, it is possible to obtain a high degree of accuracy of detection of the defect. In the present embodiment, the size of the defect to be detected is set such that the width is equal to or less than 10 pixels and the height is equal to or less than 10 pixels. Hence, in this case, in order to obtain a high degree of accuracy of detection, it is preferable that the first division image be image data having a size in which the width is equal to or less than 500 pixels and the height is equal to or less than 500 pixels. When the size of the defect to be detected is changed, for example, by a method of changing the resolution of the camera, it is preferable to adjust the size of the defect such that the width is equal to or less than 10 pixels and the height is equal to or less than 10 pixels.

In the present embodiment, the image division unit 624 divides one image into a plurality of first division images which have a size of 400 pixels in width×375 pixels in height. In other words, the image is divided into a total of 80 first division images with 10 images in the width direction and 8 images in the height direction. The size of the first division images, that is, the size of the composite image, is set to about a size of 400 pixels in height×400 pixels in width, which is the size of the image data input to the learning model, and thus the amount of change of image data caused by resizing for input to the learning model is decreased. FIG. 9 shows a part of the 80 first division images D5 obtained by the division. Among them, a first division image D5a shown in FIG. 9 is an image obtained by capturing an image of the defect FM. The image division unit 624 outputs the generated first division images D5 to the first composite image generation unit 626.

In step S50, the first composite image generation unit 626 uses a plurality of first division images to generate one composite image. The first composite image generation unit 626 outputs the generated composite image to the determination unit 628. In step S60, the determination unit 628 inputs the acquired composite image to the R-CNN serving as the learning model stored in the learning model storage unit 644 to calculate a defect probability. The defect probability is output for each predetermined region in the inspection range. In step S70, the determination unit 628 compares the defect probability output from the learning model with the threshold value stored in the storage device 64. If the defect probability is less than the threshold value in any region of the inspection range (S70: YES), the determination unit 628 proceeds to step S72, determines that the inspection target has no defect and completes the present process. If the defect probability is equal to or greater than the threshold value (equal to or greater than 2.0% in the present embodiment) in at least one region (S70: NO), the determination unit 628 proceeds to step S74, determines that the inspection target has a defect and completes the present process.

Figure 10:
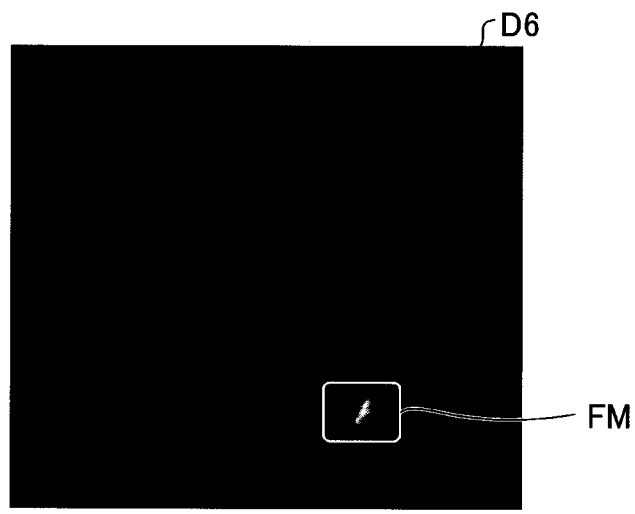
FIG. 10 is an illustrative view showing an example of a composite image generated by a first composite image generation unit.

FIG. 10 is an illustrative view showing an example of a composite image D6 generated by the first composite image generation unit 626. The composite image D6 shown in FIG. 10 is an image which is generated by combining, with the first composite image generation unit 626, the 80 first division images D5 shown in FIG. 9. By the preprocessing performed with the preprocessing unit 622, images in which the gradation value of the defect FM is high and the gradation values of regions other than the defect FM are substantially zero are superimposed to generate the composite image D6. Hence, as shown in FIG. 10, the composite image D6 may be generated as an image in which the gradation value of the defect FM is high and the gradation values of the regions other than the defective area are substantially zero. The determination unit 628 inputs the one composite image D6 shown in FIG. 10 to the learning model to be able to detect the defect FM in the composite image D6. In other words, the determination unit 628 inspects the one composite image D6 to be able to determine whether or not a defect is present in the 80 first division images D5 and thereby to determine whether or not a defect is present in the image capturing range CR of the side surface of the car body CB.

As has been described above, the inspection device 60 of the present embodiment includes: the captured image acquisition unit 620 which acquires the captured image D2 of the inspection target; the image division unit 624 which divides the captured image D2 that is acquired into a plurality of first division images D5; the first composite image generation unit 626 which superimposes the plurality of first division images D5 to generate the composite image D6; and the determination unit 628 which uses the generated composite image D6 and the learning model to determine whether or not the defect FM is present in the inspection target. In the inspection device 60 of the present embodiment, the one composite image D6 in which the first division images D5 obtained by the division are superimposed is used, and thus the size of one image used for the inspection is able to be reduced as compared with the captured image D2. Hence, even in the inspection using the learning model, it is easy to detect a defect. The inspection device 60 uses the one composite image D6 to be able to determine whether or not a defect is present in the image capturing range CR. Hence, as compared with a case where each of a plurality of first division images is inspected, though the inspection range is the same, it is possible to reduce the number of images to be inspected, with the result that it is possible to reduce the inspection time.

The inspection device 60 of the present embodiment further includes the preprocessing unit 622 which performs the preprocessing for preventing areas other than the defective area FM included in the captured image D2 serving as the inspection target from being prominent. The background other than the defective area FM is prevented from being prominent, and thus even when a plurality of first division images D5 are superimposed at the time of generation of the composite image D6, it is possible to reduce or prevent, for example, a failure in which the gradation value of the defective area FM is equal to the gradation values of the areas other than the defect FM to make it impossible to detect the defective area FM.

In the inspection device 60 of the present embodiment, the preprocessing unit 622 performs, on the captured image D2, at least the median filter, the Gaussian filter and the binarization in this order as the image processing. Hence, by removing noise in the captured image and increasing the gradation value of the defective area FM as compared with the gradation values of the areas other than the defect FM, the areas other than the defective area are prevented from being prominent, with the result that it is possible to enhance the defective area.

In the inspection device 60 of the present embodiment, the learning model is a model using the R-CNN. Hence, it is possible to use the learning model of general-purpose machine learning for the detection of a defect.

In the inspection device 60 of the present embodiment, the composite image has a size in which the width thereof is equal to or less than 50 times the width of the defect to be detected and the height thereof is equal to or less than 50 times the height of the defect to be detected. Hence, it is possible to obtain a high degree of accuracy of detection of the defect to be detected.

In the inspection device 60 of the present embodiment, the inspection target is the side surface of the car body CB of an automobile. Hence, the inspection device 60 of the present embodiment is used to inspect the side surface of the car body CB the inspection range of which is likely to be broad, and thus it is possible to further reduce the inspection time for the inspection of the side surface of the car body CB.

In the inspection device 60 of the present embodiment, the defect which is the inspection target is the sealer adhered to the side surface of the car body CB. It is possible to provide the inspection device 60 suitable for detecting a sealer that is significantly smaller than the inspection range from the side surface of the car body CB, the inspection range of which is likely to be broad.

B. Second Embodiment

Figure 11:
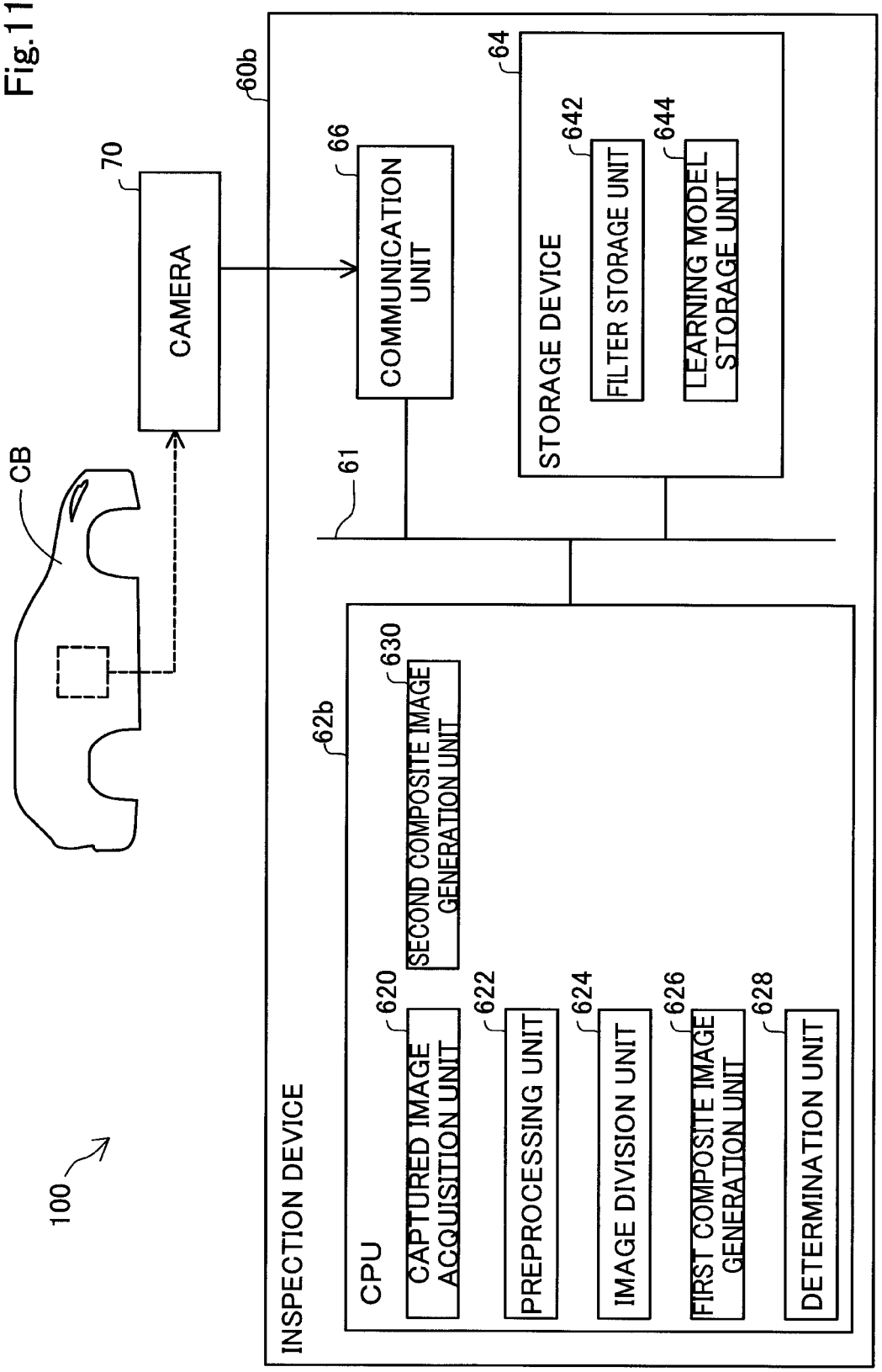
FIG. 11 is a block diagram showing the functional configuration of an inspection device according to a second embodiment of the present disclosure.

FIG. 11 is a block diagram showing the functional configuration of an inspection device 60b according to a second embodiment of the present disclosure. The inspection device 60b of the second embodiment differs from the inspection device 60 of the first embodiment in that the inspection device 60b further includes, instead of the CPU 62, a CPU 62b which includes a second composite image generation unit 630, and the other configurations are the same as those of the inspection device 60 of the first embodiment. The second composite image generation unit 630 uses second division images to generate a composite image.

Figure 12:
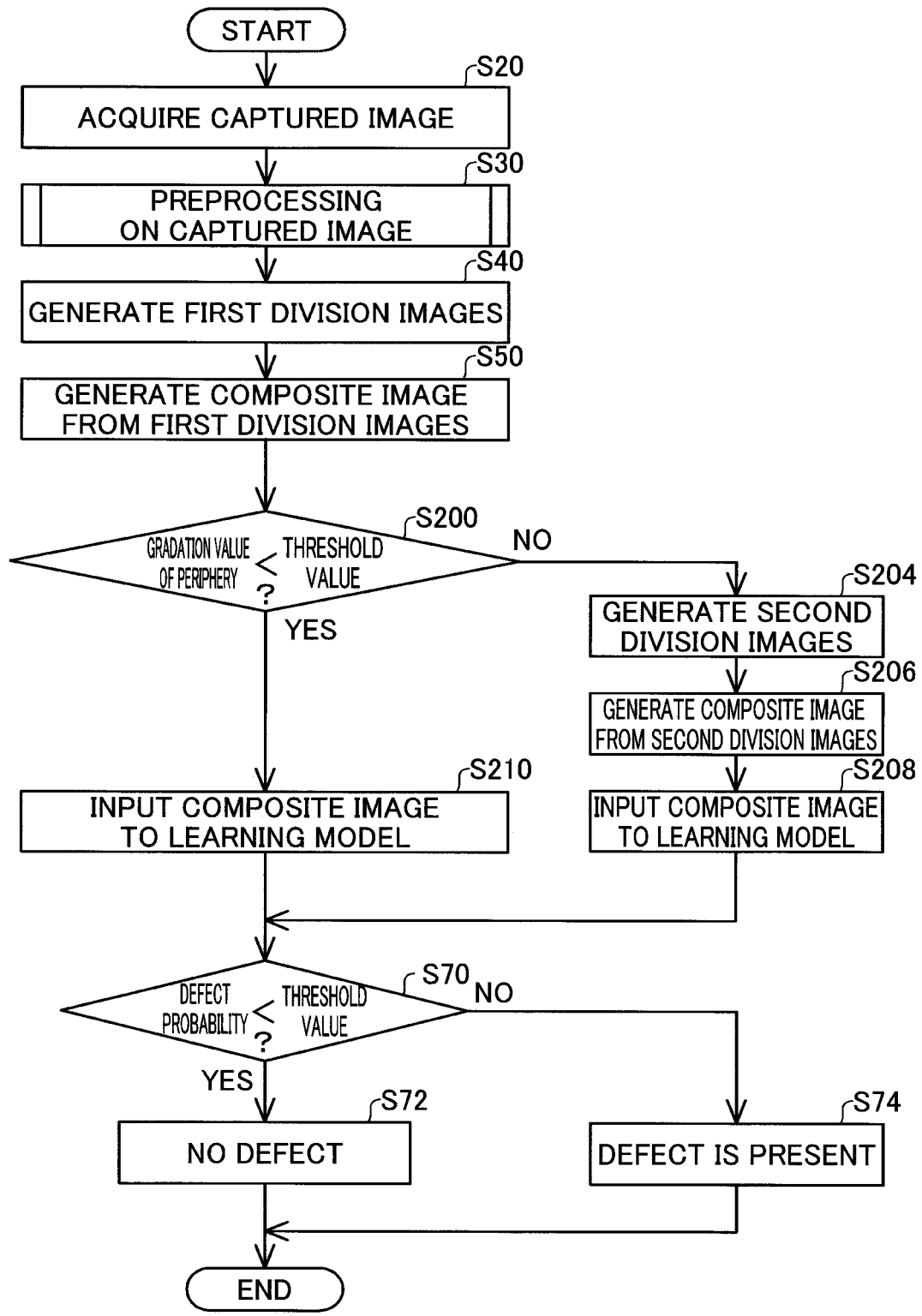
FIG. 12 is a process chart showing the details of an inspection method performed by the inspection device according to the second embodiment.

FIG. 12 is a process chart showing the details of an inspection method performed by the inspection device 60b according to the second embodiment. The inspection method of the second embodiment differs from the inspection method of the first embodiment in that the inspection method of the second embodiment includes steps S200 to S210 instead of step S60, and the other configurations are the same as those of the inspection method of the first embodiment. When the inspection device 60b of the present embodiment determines that an object is present in the periphery of the composite image, the inspection device 60b divides the composite image to generate the second division images, and uses a composite image generated by combining the second division images so as to perform the inspection.

In step S200, the second composite image generation unit 630 determines whether or not an object is present in the periphery of the composite image. In the present disclosure, the "periphery of an image" means pixels which are arranged in the outermost part of the image. In the present embodiment, the second composite image generation unit 630 determines whether or not an object is present in the four corners of the image in the periphery thereof. For example, by using the gradation values of pixels in predetermined positions, it is possible to determine whether or not an object is present. The second composite image generation unit 630 compares the gradation values of pixels in the four corners of the composite image with a predetermined threshold value. The present embodiment is not limited to using the pixels in the four corners, and pixel groups in predetermined regions including the pixels in the four corners may be used.

If at least one of the gradation values of the four corners of the first division image is less than the threshold value (S200: YES), the second composite image generation unit 630 proceeds to step S210. Since step S210 is the same as step S60 described in the first embodiment, the description thereof is omitted. If all the gradation values of the pixels in the four corners of the composite image are equal to or greater than the threshold value (S200: NO), the second composite image generation unit 630 proceeds to step S204.

In step S204, the image division unit 624 sets the division position of the composite image. Images obtained by dividing the composite image are also referred to as "second division images". The division position for generating the second division images is set by displacing only any preset pixels from an end side of the composite image. The division position may be changed both in the width direction and in the height direction or may be changed only in one of them.

In step S206, the second composite image generation unit 630 uses the second division images to generate the composite image. In the present embodiment, as will be described later, the second division images are interchanged based on predetermined rules and are combined, and thus the composite image is generated. In step S208, the determination unit 628 inputs the generated composite image to the learning model stored in the learning model storage unit 644 to calculate a defect probability. Since the steps subsequent to step S70 are the same as in the first embodiment, the description thereof is omitted.

Figure 13:
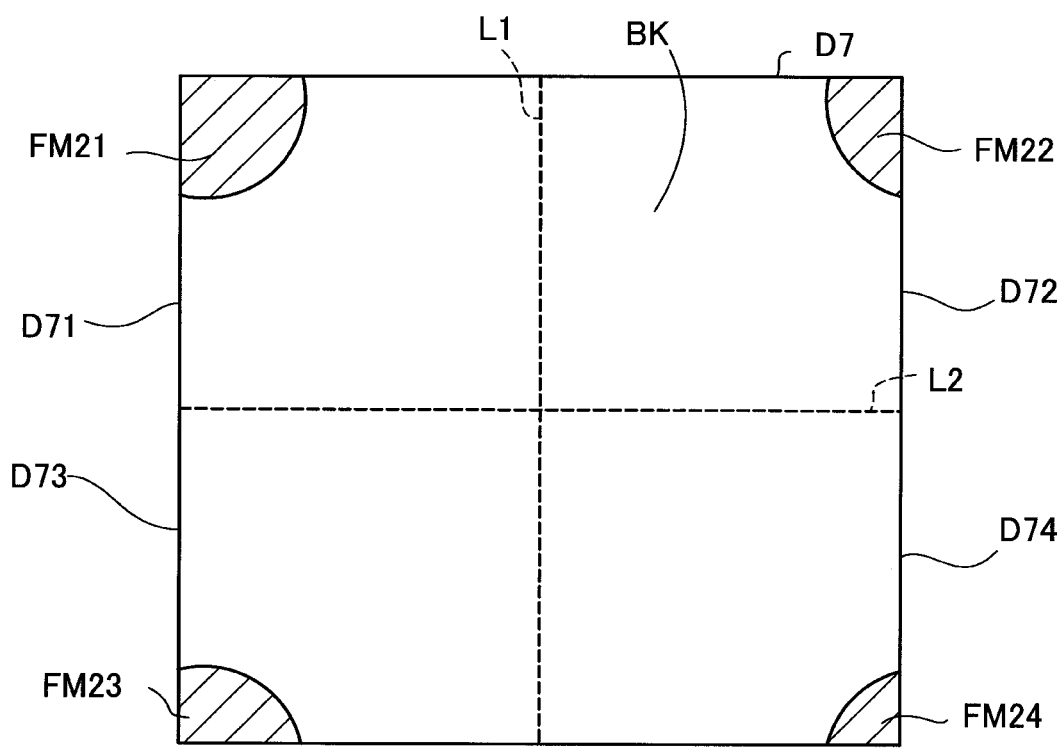
FIG. 13 is an illustrative view schematically showing a composite image generated by superimposing first division images.
Figure 14:
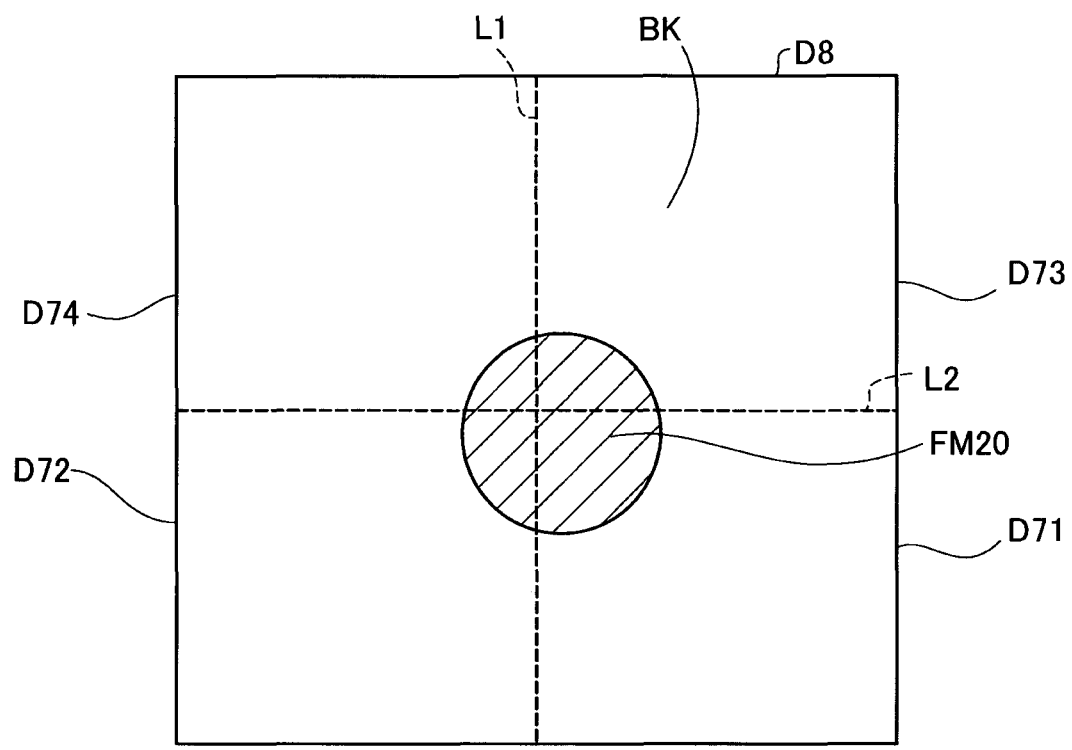
FIG. 14 is an illustrative view schematically showing a composite image generated with second division images.

A method for generating the second division images will be described with reference to FIGS. 13 and 14. FIG. 13 is an illustrative view schematically showing a composite image D7 generated by superimposing first division images. The composite image D7 is an example of the composite image in which an object is determined to be present in the periphery. FIG. 13 schematically shows second division images D71 to D74 obtained by dividing the composite image D7. FIG. 14 is an illustrative view schematically showing a composite image D8 generated with the second division images D71 to D74. In FIGS. 13 and 14, for ease of understanding of this technique, an area corresponding to a foreign substance is hatched.

As shown in FIG. 13, in the four corners of the composite image D7, objects FM21 to FM24 are respectively present. Hence, the gradation values of pixels in the four corners of the composite image D7 are higher than the gradation values of regions such as the background other than the defect. As an example where the objects FM21 to FM24 are present in the four corners of the composite image D6, there is a case where an object is present in the division positions of the image provided by the image division unit 624. In the example of FIG. 13, in a position where the division position in the height direction and the division position in the width direction intersect each other, the one object FM20 shown in FIG. 14 is present, the object FM20 is divided into the objects FM21 to FM24 and the objects FM21 to FM24 are present in the four first division images. As a result, when the first division images are superimposed by the second composite image generation unit 630, the objects FM21 to FM24 are present in the four corners of the one composite image D7. In this case, for example, it is likely that the learning model which has completed learning is not able to recognize the objects FM21 to FM24 as the defect.

By the preprocessing on the captured image, the gradation values of the objects FM21 to FM24 are higher than the gradation values of the background BK, and all the gradation values of the four corners of the composite image D7 are equal to or greater than the threshold value. Hence, the second composite image generation unit 630 determines that an object is present in the periphery of the composite image D7. The image division unit 624 divides the composite image D7 based on predetermined rules to generate the second division images D71 to D74.

In the present embodiment, as indicated by broken lines L1 and L2 in FIG. 13, the division positions of the composite image D7 are lines which are perpendicular to the sides of the composite image D7 and are arranged at intermediate points in the width direction and the height direction. The image division unit 624 divides the composite image D7 in the positions of the broken lines L1 and L2 into four equal parts to generate the four second division images D71 to D74 whose sizes are equal to each other.

The second composite image generation unit 630 uses the generated second division images D71 to D74 to generate the composite image D8. Specifically, the second composite image generation unit 630 interchanges the second division images arranged in diagonally opposite positions and combines them to generate the composite image D8. As shown in FIG. 13, the second composite image generation unit 630 interchanges the positions of the second division image D71 and the second division image D74 arranged in diagonally opposite positions, and interchanges the positions of the second division image D72 and the second division image D73 arranged in diagonally opposite positions. The second composite image generation unit 630 combines the second division images D71 to D74, the positions of which are interchanged, and thereby generates the composite image D8 shown in FIG. 14. As a result, as shown in FIG. 14, the one object FM20 is displayed which is obtained by combining the objects FM21 to FM24 that are divided in the composite image D7. Consequently, even when the image of the object is divided at the time of generation of the first division images, the shape before the division is able to be restored when the composite image D8 is formed. Hence, the determination unit 628 utilizes the learning model to be able to normally determine whether or not a defect is present in the composite image D8.

In the inspection device 60b of the present embodiment, when the second composite image generation unit 630 determines that an object is present in the periphery of the composite image D7, the second composite image generation unit 630 uses the second division images D71 to D74 which are divided in the division positions different from the division positions for generating the first division images, and thereby generates the composite image D8. Even when the object FM20 in the captured image is divided at the time of generation of the first division images, the shape of the object FM20 is able to be restored at the time of formation of the composite image D8. Hence, it is possible to reduce or prevent a failure in which an abnormality is overlooked by dividing the object FM20 when the first division images are generated.

In the inspection device 60*b* of the present embodiment, when the gradation value of the periphery of the composite image D7 is greater than the predetermined threshold value, the second composite image generation unit 630 determines that an object is present in the periphery of the composite image D7. Hence, by a simple method, it is possible to detect an object in the periphery of the composite image D7.

In the inspection device 60*b* of the present embodiment, the second composite image generation unit 630 interchanges, among a plurality of second division images D71, the positions of the second division images D71 opposite to each other, and combines them to generate the composite image D8. As compared with a case where the division positions are changed and the first division images are generated again, by a simple method, it is possible to generate the composite image D8.

C. Third Embodiment

Figure 15:
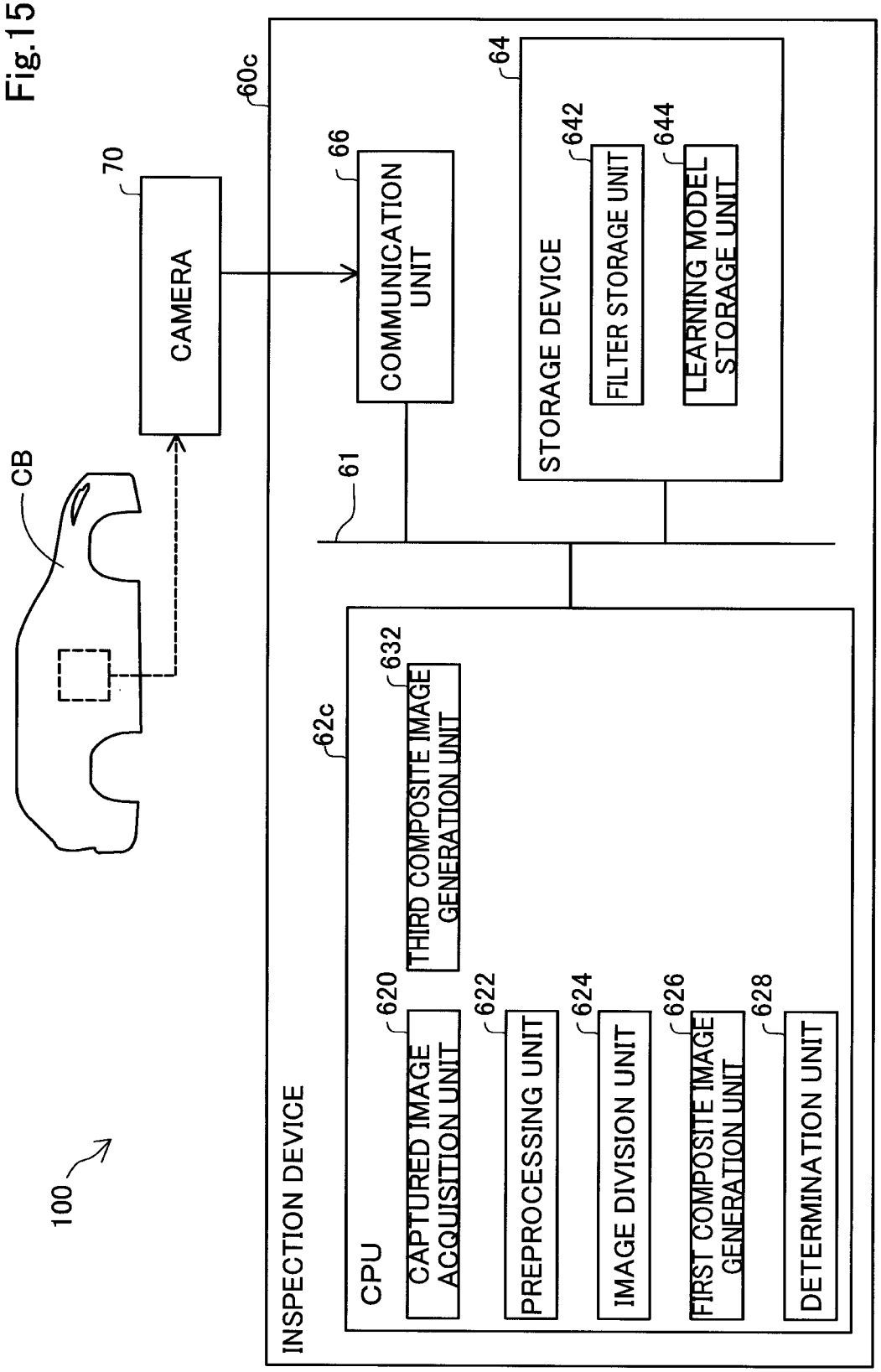
FIG. 15 is a block diagram showing the functional configuration of an inspection device according to a third embodiment of the present disclosure.

FIG. 15 is a block diagram showing the functional configuration of an inspection device 60*c* according to a third embodiment of the present disclosure. The inspection device 60*c* of the third embodiment differs from the inspection device 60 of the first embodiment in that the inspection device 60*c* further includes, instead of the CPU 62, a CPU 62*c* which includes a third composite image generation unit 632, and the other configurations are the same as those of the inspection device 60 of the first embodiment. The third composite image generation unit 632 extracts a temporary defect image, and superimposes the temporary defect image to generate a composite image.

Figure 16:
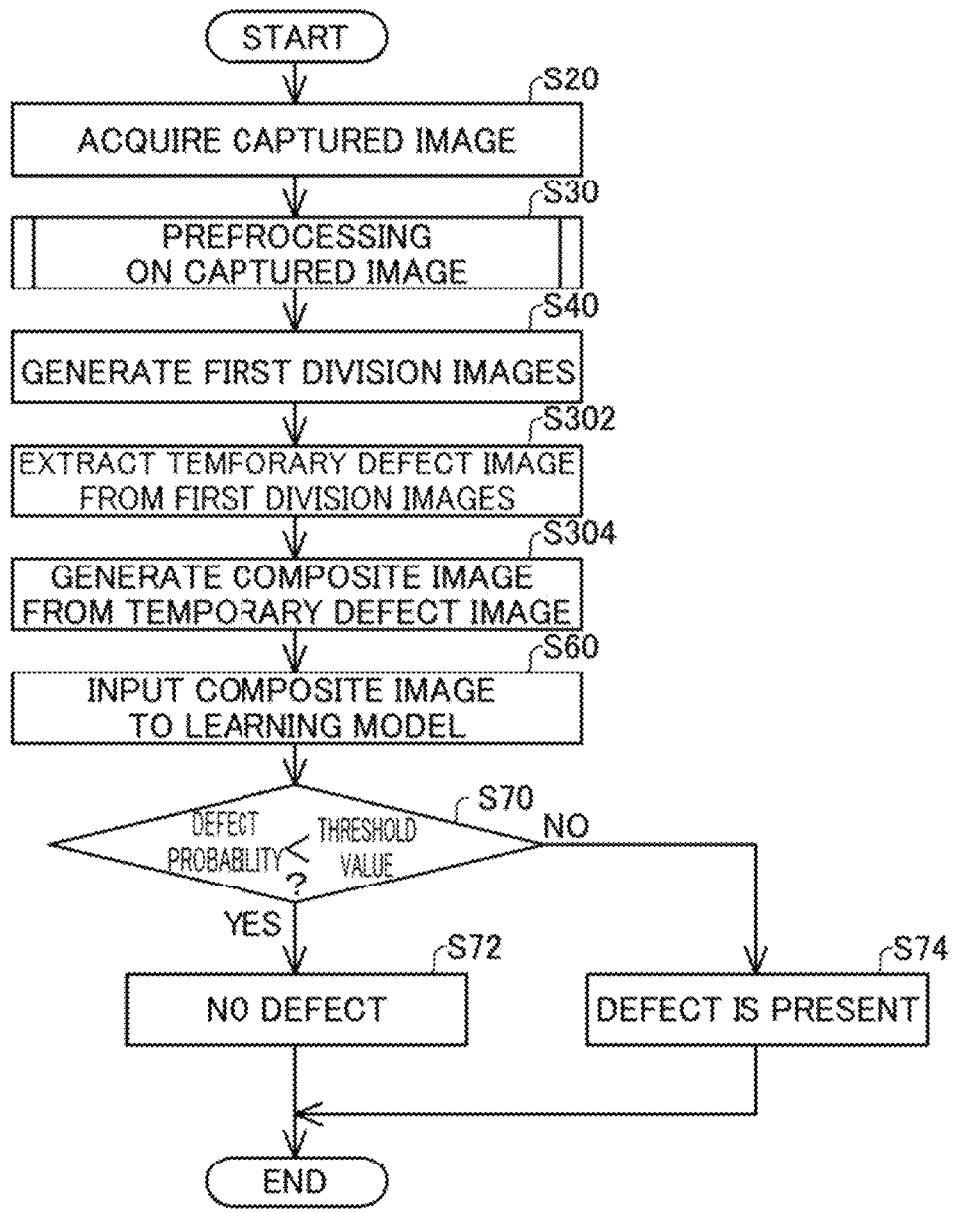
FIG. 16 is a process chart showing the details of an inspection method performed by the inspection device according to the third embodiment.

FIG. 16 is a process chart showing the details of an inspection method performed by the inspection device 60*c* according to the third embodiment of the present disclosure. The inspection method of the third embodiment differs from the inspection method of the first embodiment in that the inspection method of the third embodiment includes, instead of step S50, steps S302 and S304, and the other configurations are the same as those of the inspection method of the first embodiment. The inspection device 60*c* of the present embodiment extracts, from the generated first division images, as the temporary defect image, a first division image which is predicted to be more likely to have a defect, and uses the temporary defect image to perform the inspection. The temporary defect image is an example of the first division image.

In step S302, the third composite image generation unit 632 extracts, from the first division images, as the temporary defect image, the first division image which is predicted to be more likely to have a defect. In the present embodiment, the first division image which is predicted to be more likely to have a defect is extracted by using pattern matching with a pattern image that is previously stored in the storage device 64 and includes a defect image. The third composite image generation unit 632 uses the pattern matching to compare each of the generated first division images with the pattern image, and thereby extracts, as the temporary defect image, a first division image similar to the pattern image. The number of temporary defect images is not limited to one, and a plurality of temporary defect images may be extracted according to the number of defects detected. A method for extracting the temporary defect image is not limited to the pattern matching, and the temporary defect image may be extracted, for example, by comparing the gradation value of the first division image with a predetermined threshold value. In step S304, the third composite image generation unit 632 superimposes and combines the extracted temporary defect images to generate a composite image. Since the steps subsequent to step S60 are the same as in the first embodiment, the description thereof is omitted.

In the inspection device 60*c* of the present embodiment, the third composite image generation unit 632 extracts, from a plurality of first division images, the temporary defect image which is predicted to be more likely to have a defect, and uses the temporary defect image to generate the composite image. Hence, when the composite image is generated, the number of images combined is reduced, and thus it is possible to further reduce the inspection time.

In the inspection device 60*c* of the present embodiment, the temporary defect image is the first division image extracted by the pattern matching. Hence, by a simple method, it is possible to extract the temporary defect image.

D. Other Embodiments (D1) In the second embodiment described above, the example is shown where the second composite image generation unit 630 uses the composite image D7 to detect objects in the four corners of the composite image D7. By contrast, the second composite image generation unit 630 may use the first division images to determine whether or not an object is divided when the first division images are generated. In this case, the second composite image generation unit 630 may omit the generation of the composite image using the first division images and generate the second division images.

(D2) Although in the second embodiment described above, the example is shown where the second composite image generation unit 630 detects objects in the four corners of the composite image D7, the present disclosure is not limited to the four corners of the composite image D7. For example, at least one of the objects in the four corners of the composite image D7 may be detected. The second composite image generation unit 630 may detect, among the four sides of the composite image D7, objects present on any two sides opposite to each other. In this case, the composite image may be divided into two second division images instead of the four second division images, and the two divided images may be interchanged to generate the composite image.

(D3) In the second embodiment described above, the example is shown where, when it is detected that an object is present in the periphery of the composite image D7, the determination unit 628 uses only the newly generated composite image D8 to determine whether or not a defect is present. By contrast, the determination unit 628 uses the composite image D8 to determine whether or not a defect is present, and may further use the composite image D7 to determine whether or not a defect is present. In this case, the determination unit 628 individually inputs each of the composite image D8 and the composite image D7 to the learning model to determine whether or not a defect is present. The determination unit 628 may further superimpose the composite image D8 and the composite image D7 to generate a composite image, and input the generated composite image to the learning model to determine whether or not a defect is present.

(D4) In the third embodiment described above, the example is shown where the third composite image generation unit 632 extracts, from a plurality of first division images, the temporary defect image which is predicted to be more likely to have a defect, and uses the temporary defect image to generate the composite image. By contrast, the third composite image generation unit 632 may combine, among the first division images, only the remaining first division images which are not extracted as the temporary defect image to generate a captured image. In this case, the determination unit 628 may input each of the temporary defect image and the generated composite image to the learning model to determine whether or not a defect is present. The determination unit 628 may individually input each of the temporary defect images to the learning model without combining the temporary defect images to determine whether or not a defect is present.

(D5) In the description of each of the embodiments described above, the example is used where the inspection device 60 detects the white sealer adhered to the top of the grey car body CB as a defect. By contrast, the inspection device 60 may be applied to, for example, cases where defects having colors other than white such as a scratch or a recess and a projection in the side surface of the car body CB and the adherence of a foreign substance of a color other than white are detected on the captured image. For example, when a black defect is detected, a captured image may be generated in which the background of the captured image is set to white and the defective area is set to black. When a red defect is detected, a captured image may be used which has only the R value among the RGB values of the captured image.

(D6) In the second embodiment described above, the composite image is divided to generate the second division images, and the second division images are combined to generate the composite image. By contrast, the division positions of the image may be performed by generating new first division images through the change of the division positions of the captured image acquired with the captured image acquisition unit 620.

The control unit and its method described in the present disclosure may be realized by a dedicated computer that is provided by configuring a processor and memory programmed so as to execute one or more functions embodied by a computer program. Alternatively, the control unit and its method described in the present disclosure may be realized by a dedicated computer that is provided by configuring a processor using one or more dedicated hardware logic circuits. Further, alternatively, the control unit and its method described in the present disclosure may be realized by one or more dedicated computers that are provided by combining a processor and memory programmed so as to execute one or more functions and another processor configured by one or more hardware logic circuits. The computer program may also be stored in a computer-readable, non-transitory tangible recording medium as instructions to be executed by the computer.

The present disclosure is not limited to the above-described embodiments, and may be realized with various configurations without departing from the spirit of the present disclosure. For example, the technical features in the embodiments may be replaced or combined as appropriate to solve some or all of the problems described above or to achieve some or all of the effects described above. Unless the technical feature is described herein as essential, it may be deleted as appropriate. For example, the present disclosure may be realized by embodiments described below.

(1) According to an aspect of the present disclosure, an inspection device is provided. The inspection device includes: a captured image acquisition unit configured to acquire a captured image of an inspection target; an image division unit configured to divide the captured image into a plurality of first division images; a first composite image generation unit configured to generate a composite image by superimposing the plurality of first division images; and a determination unit configured to determine whether a defect is present in the inspection target by using the generated composite image and a learning model.

According to the inspection device of this aspect, the size of one image used for the inspection is decreased as compared with the captured image, and thus it is easy to detect a defect. Also, the number of images inspected is reduced, with the result that it is possible to reduce the inspection time.

(2) The inspection device of the aspect described above may further include a preprocessing unit configured to perform image preprocessing for diminishing a defective area, wherein the defective area is included in any one of the captured image, the first division image and the composite image.

According to the inspection device of this aspect, it is possible to reduce or prevent a failure in which the defective area cannot be detected.

(3) In the inspection device of the aspect described above, the preprocessing unit may perform a preprocessing by using at least a median filter, a Gaussian filter and binarization, and the preprocessing unit may perform a median filter, a Gaussian filter and binarization in this order.

According to the inspection device of this aspect, it is possible to remove noise in the captured image and increase the gradation value of the defective area as compared with the areas other than the defect.

(4) The inspection device of the aspect described above may further include a second composite image generation unit configured to generate a composite image with a plurality of second division images obtained by further dividing the generated composite image when an object is in at least a part of the periphery of the first division image or the periphery of the composite image.

According to the inspection device of this aspect, it is possible to reduce or prevent a failure in which an abnormality is overlooked by dividing the object when the first division images are generated.

(5) In the inspection device of the aspect described above, the second composite image generation unit may determine that the object is in the periphery of the first division image or the periphery of the composite image when an gradation value of the periphery of the first division image or the composite image is greater than a predetermined threshold value.

According to the inspection device of this aspect, by a simple method, it is possible to detect the object in the periphery of the composite image.

(6) In the inspection device of the aspect described above, the second composite image generation unit may generate the composite image by combining the plurality of second division images that is interchanged positions of second division images opposite to each other.

According to the inspection device of this aspect, as compared with a case where division positions are changed and the first division images are generated again, by a simple method, it is possible to generate the composite image.

(7) The inspection device of the aspect described above may further include a third composite image generation unit configured to generate the composite image by superimposing a temporary defect image that is extracted from the plurality of first division images, wherein the temporary defect image is a image that is predicted to be more likely to have the defect.

According to the inspection device of this aspect, when the composite image is generated, the number of images combined is reduced, and thus it is possible to further reduce the inspection time.

(8) In the inspection device of the aspect described above, the temporary defect image may be at least one of the first division image having a gradation value greater than a predetermined threshold value and the first division image extracted by pattern matching.

According to the inspection device of this aspect, by a simple method, it is possible to extract the temporary defect image.

(9) In the inspection device of the aspect described above, the learning model may be a model using R-CNN.

According to the inspection device of this aspect, it is possible to use the learning model of general-purpose machine learning for the detection of a defect.

(10) In the inspection device of the aspect described above, the composite image may have a size in which the width of the composite image is equal to or less than 50 times the target width of the defect and the height of the composite image is equal to or less than 50 times the target height of the defect.

According to the inspection device of this aspect, it is possible to obtain a high degree of accuracy of detection of the defect to be detected.

(11) In the inspection device of the aspect described above, the inspection target may be a side surface of the car body of an automobile.

According to the inspection device of this aspect, it is possible to further reduce the inspection time in the inspection of the side surface of the car body.

(12) In the inspection device of the aspect described above, the defect may be a sealer adhered to the side surface of the car body.

According to the inspection device of this aspect, it is possible to provide the inspection device suitable for detecting a significantly smaller sealer than an inspection range.

The present disclosure may also be realized in various forms other than the inspection device. For example, the present disclosure may be realized in the forms of a method for manufacturing the inspection device, a foreign substance detection device, a foreign substance detection method, an inspection method, an inspection system, a method for controlling an inspection system, a method for controlling the inspection device, a computer program for realizing these control methods, a non-temporary recording medium having recorded the computer program and the like.

What is claimed is:

1. An inspection device comprising:
a memory that stores a program; and
a processor configured to execute the program so as to:
acquire a captured image of an inspection target;
divide the captured image into a plurality of first division images;
generate a composite image by superimposing the plurality of first division images;
determine whether a defect is present in the inspection target by using the composite image and a learning model; and
generate a second composite image with a plurality of second division images obtained by further dividing the composite image when an object is in at least a part of a periphery of the first division image or a periphery of the composite image.

2. The inspection device according to claim 1, further comprising:
image preprocessing for diminishing a defective area, wherein the defective area is included in any one of the captured image, the first division image and the composite image.

3. The inspection device according to claim 2,
wherein the preprocessing is performed by using at least a median filter, a Gaussian filter and binarization, and
the processor performs the preprocessing using the median filter, the Gaussian filter and the binarization in this order.

4. The inspection device according to claim 1,
wherein the processor is further configured to determine that the object is in the periphery of the first division image or the periphery of the composite image when a gradation value of the periphery of the first division image or the composite image is greater than a predetermined threshold value.

5. The inspection device according to claim 1,
wherein the processor is further configured to generate the second composite image by combining the plurality of second division images that is interchanged positions of second division images opposite to each other.

6. The inspection device according to claim 1, wherein the processor is further configured to:
generate a third composite image by superimposing a temporary defect image that is extracted from the plurality of first division images, wherein the temporary defect image is an image that is predicted to be more likely to have the defect.

7. The inspection device according to claim 6,
wherein the temporary defect image is at least one of the plurality of first division images having a gradation value greater than a predetermined threshold value and the at least one of the plurality of first division images is extracted by pattern matching.

8. The inspection device according to claim 1,
wherein the learning model is a model using R-CNN.

9. The inspection device according to claim 1,
wherein the composite image has a size in which the width of the composite image is equal to or less than 50 times the target width of the defect and the height of the composite image is equal to or less than 50 times the target height of the defect.

10. The inspection device according to claim 1,
wherein the inspection target is a side surface of a car body of an automobile.

11. The inspection device according to claim 10,
wherein the defect is a sealer adhered to the side surface of the car body.

12. The inspection device according to claim 1, wherein the periphery of the first division image is defined as an outermost part of the first division image in which pixels are arranged, and the periphery of the composite image is defined as an outermost part of the composite image in which pixels are arranged, and the processor is further configured to determine that the object is in the periphery of the first division image or the periphery of the composite image when a gradation value of the pixels in the periphery of the first division image or the composite image is greater than a predetermined threshold value.

13. An inspection method comprising:
acquiring a captured image of an inspection target;
dividing the captured image into a plurality of first division images;
generating a composite image by superimposing the plurality of first division images;
determining whether a defect is present in the inspection target by using the generated composite image and a learning model; and
generating a second composite image with a plurality of second division images obtained by further dividing the composite image when an object is in at least a part of a periphery of the first division image or a periphery of the composite image.

14. A computer-readable non-transitory storage medium configured to store a program executed by a computer included in an inspection device,
wherein the program causes the computer to realize:
a function of acquiring a captured image of an inspection target;
a function of dividing the captured image that is acquired into a plurality of first division images;
a function of generating a composite image by superimposing the plurality of first division images;
a function of determining whether a defect is present in the inspection target by using the composite image and a learning model; and
a function of generating a second composite image with a plurality of second division images obtained by further dividing the composite image when an object is in at least a part of a periphery of the first division image or a periphery of the composite image.

* * * * *